United States Patent
Cholley et al.

(10) Patent No.: US 9,212,324 B2
(45) Date of Patent: Dec. 15, 2015

(54) HYDROPROCESSING CATALYST, PREPARATION METHOD THEREOF AND USE OF SAME

(75) Inventors: Thierry Cholley, Le Havre (FR); Jean-Pierre Dath, Beloeil Hainault (BE); Claude Brun, Idron (FR); Georges Fremy, Sauveterre de Bearn (FR); Francis Humblot, Lanneplaa (FR)

(73) Assignees: TOTAL RAFFINAGE MARKETING, Puteaux (FR); IFP, Malmaison (FR)

( * ) Notice: Subject to any disclaimer, the term of this patent is extended or adjusted under 35 U.S.C. 154(b) by 370 days.

(21) Appl. No.: 11/795,411

(22) PCT Filed: Jan. 19, 2006

(86) PCT No.: PCT/FR2006/000126
§ 371 (c)(1),
(2), (4) Date: Dec. 14, 2007

(87) PCT Pub. No.: WO2006/077326
PCT Pub. Date: Jul. 27, 2006

(65) Prior Publication Data
US 2008/0194892 A1  Aug. 14, 2008

(30) Foreign Application Priority Data
Jan. 20, 2005  (FR) ...................... 05 00579

(51) Int. Cl.
*B01J 31/26* (2006.01)
*C01G 45/04* (2006.01)
*C01G 17/00* (2006.01)
*B01J 31/00* (2006.01)
*B01J 23/00* (2006.01)
*C10G 45/04* (2006.01)
*B01J 23/85* (2006.01)
*B01J 23/94* (2006.01)
*B01J 31/02* (2006.01)
*B01J 37/02* (2006.01)
*B01J 37/20* (2006.01)
*B01J 38/52* (2006.01)
*C10G 45/08* (2006.01)
*B01J 21/04* (2006.01)
*B01J 23/882* (2006.01)

(52) U.S. Cl.
CPC ............... *C10G 45/04* (2013.01); *B01J 23/85* (2013.01); *B01J 23/94* (2013.01); *B01J 31/0209* (2013.01); *B01J 37/0203* (2013.01); *B01J 37/20* (2013.01); *B01J 38/52* (2013.01); *C10G 45/08* (2013.01); *B01J 21/04* (2013.01); *B01J 23/882* (2013.01)

(58) Field of Classification Search
None
See application file for complete search history.

(56) References Cited

U.S. PATENT DOCUMENTS

| | | | | |
|---|---|---|---|---|
| 3,016,347 A | * | 1/1962 | O'Hara | 208/216 R |
| 5,554,274 A | * | 9/1996 | Degnan et al. | 208/111.1 |
| 6,325,920 B1 | * | 12/2001 | Brun et al. | 208/216 R |
| 6,540,908 B1 | * | 4/2003 | Eijsbouts et al. | 208/216 R |

FOREIGN PATENT DOCUMENTS

| | | | | |
|---|---|---|---|---|
| EP | 1 046 424 A | | 10/2000 | |
| WO | wo/03/068828 | * | 8/2003 | ............ C08F 10/00 |
| WO | WO 2004/091789 A | | 10/2004 | |

* cited by examiner

*Primary Examiner* — Yun Qian
(74) *Attorney, Agent, or Firm* — Sughrue Mion, PLLC

(57) ABSTRACT

The invention relates to a hydrocarbon hydroprocessing catalyst comprising a support based on at least one refractory oxide, at least one metal from group VIII and at least one metal from group VIB. The inventive catalyst is characterized in that it also comprises at least one organic compound having formula (I) or (II) in which each $R_1$ represents independently an alkyl group at $C_{1-18}$, an alkenyl group at $C_{2-18}$, an aryl group at $C_{6-18}$, a cycloalkyl group at $C_{3-8}$, an alkylaryl or arylalkyl group at $C_{7-20}$, or the two $R_1$ groups together form a divalent group at $C_{2-18}$, and $R_2$ represents an alkylene group at $C_{1-18}$, an arylene group at $C_{6-18}$, a cycloalkylene group at $C_{3-7}$, or a combination of same. The invention also relates to a method of preparing one such catalyst and to the use thereof for hydroprocessing or hydrocracking.

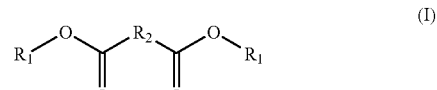

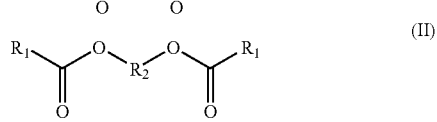

22 Claims, No Drawings

HYDROPROCESSING CATALYST, PREPARATION METHOD THEREOF AND USE OF SAME

The present invention relates to a hydroprocessing catalyst, to the method for the preparation thereof and to the use of this catalyst in a method of hydroprocessing and/or hydrocracking hydrocarbons, in particular hydrocarbons derived from petroleum fractions with a boiling point range of between 40 and 560° C.

Currently, the demand for desulfurized, denitrogenated and dearomatized hydrocarbon compounds is increasing and manufacturers are developing catalysts which are increasingly effective with respect to the purification of hydrocarbons. However, these new catalysts are much more expensive and are accessible only from a limited number of producers. In addition, from their first regeneration, these catalysts exhibit an activity that is often much lower than their initial activity in the fresh state under the same operating conditions. An additional specific rejuvenation treatment sometimes makes it possible to recover an activity similar to the initial activity and thus makes it possible to reuse the catalyst for a further cycle of deep hydrodesulfurization and the production of distillates having sulfur contents of less than 10 ppm. Several rejuvenation treatments are proposed on the market. They generally combine regeneration steps under specific conditions, and chemical and thermal treatments, and can be associated with ex situ sulfurizations of the catalyst.

Numerous "conventional" catalysts, based on carriers formed of refractory oxide(s) and containing a combination of group VIB and VIII metals are today used in refineries, in the fresh or regenerated state, either in hydroprocessing or in hydrocracking. If it proves to be impossible to significantly increase their activity in desulfurization and/or denitrogenation, these catalysts will have to be recovered, stored or destroyed when the specifications imposed with regard to fuels become so restrictive that it will no longer be possible to use them. This storage or elimination of solids could also be subject to environmental and safety restrictions and could generate significant additional costs for refiners.

The Applicant has therefore sought, firstly, to render known catalysts based on refractory oxide(s) and on group VIB and VIII metals more effective, and to confer on them desulfurization and denitrogenation activities that are at least equivalent to those of the best catalysts on the market, and, secondly, to improve the activity of regenerated hydroprocessing catalysts in order to increase the number of recycling cycles and to delay the point at which they are discarded and destroyed.

All hydroprocessing or hydrocracking catalysts containing metals in the oxide state, in order to be active, must necessarily be sulfurized before use. This sulfurization can be carried out either in situ in the hydroprocessing reactor of the refinery, or ex situ. The sulfurization can be carried out by means of hydrogen sulfide, mercaptans, organic sulfides, polysulfides and/or elemental sulfur, these compounds being introduced alone, as a mixture with a solvent, or at the same time as the feedstock.

Before this sulfurization step, some of these catalysts are premodified by a treatment with organic compounds.

The sulfurization and the premodification can be carried out in situ, i.e. in the hydroprocessing/hydroconversion reactor, or else ex situ, i.e. in a dedicated reactor. A premodification ex situ combined with a sulfurization in situ in the hydroprocessing/hydroconversion reactor can also be envisioned.

The range of organic compounds that can be used is quite broad. It is thus known practice to modify these catalysts by means of acids of thioglycolic type, or else thioalcohols, thioacetone compounds and thiodiazoles, or thiocyanates as proposed, in particular, by the following applications: EP 289211, EP 300629, EP 338788, EP 357295, EP 456592, EP 478365 and EP 506206. Other catalysts have been modified by treatment with alcohol-acid organic compounds (EP-482817), optionally etherified mono-, di- or polyalcohols (EP 601722, U.S. Pat. No. 3,954,673, U.S. Pat. No. 4,012,340, WO 01/76741), compounds of urea type, polyamines, EDTA, hydrazine and other nitrogenous compounds (EP 181035, EP 335754, EP 1043069, WO 01/76741, U.S. Pat. No. 3,954,673 and U.S. Pat. No. 4,012,340). Catalysts modified with $C_2$-$C_{14}$ monoesters are described in patent applications EP 466 568 and EP 1046424.

All these compounds are aimed at improving the effectiveness of the catalysts in hydroprocessing, more particularly in hydrodesulfurization. However, these modifications do not always make it possible to sufficiently increase the performance levels of the catalyst in order to face up to the specifications regarding sulfur contents in fuels which are continually becoming more and more restrictive for refiners. Thus, for example, according to the guidelines of the European Parliament and of the European Council, European Community countries must produce diesel fuel containing less than 50 ppm of sulfur from 2005 and less than 10 ppm by 2008-2011, while the 2004 standard is 350 ppm. Similarly, for all the countries of North America, the sulfur content of diesel must go from 500 ppm to 15 ppm from 2006. Certain countries such as Germany are ahead of the European legislation and already make it obligatory to sell diesel at less than 10 ppm. Similar restrictions already apply to petrol and the other fuels. This change in specifications imposes restrictions on the production by refineries, and refiners must bow to these restrictions at the cost of often considerable investments in hydroprocessing or hydrocracking units and/or, much more economically, through improving the desulfurization performance levels of the current catalysts and the possibility of recycling them several times at their highest performance level.

With this aim, the Applicant has designed a new type of hydroprocessing catalyst, based on refractory oxides and on metals of groups VIB and VIII of the Periodic Table of Elements, which exhibit, after sulfurization, a greatly improved activity in desulfurization and in denitrogenation.

The subject of the present invention is thus a hydroprocessing catalyst comprising a carrier based on at least one refractory oxide, at least one metal of group VIII and at least one metal of group VIB of the Periodic Table of Elements, characterized in that it also comprises at least one organic compound comprising at least two carboxylic ester functions, of formula (I) or (II)

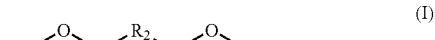

in which
each $R_1$ independently represents a $C_1$-$C_{18}$ alkyl, $C_2$-$C_{18}$ alkenyl, $C_6$-$C_{18}$ aryl, $C_3$-$C_8$ cycloalkyl, $C_7$-$C_{20}$ alkylaryl or $C_7$-$C_{20}$ arylalkyl group, or the two $R_1$ groups together form a $C_2$-$C_{18}$ divalent group, and $R_2$ represents a $C_1$-$C_{18}$ alkylene, $C_6$-$C_{18}$ arylene or $C_3$-$C_7$ cycloalkylene group, or a combination thereof, it being possible for the carbon chain of the hydrocarbon-based groups represented by $R_1$ and $R_2$ to contain or bear one or more heteroatoms selected from N, S and O, and for each of the groups $R_1$ and $R_2$ to bear one or more substituents of formula —C(=O)O—$R_1$ or —O—C(=O)—$R_1$ where $R_1$ has the meaning indicated above.

In fact, the Applicant has established that the presence on the catalysts of at least one organic compound of formula (I) or (II) increases the effectiveness of the catalysts in desulfurization and in denitrogenation, after activation by sulfurization under known conditions. By using these new catalysts for hydrocarbon hydroprocessing, it is possible, in comparison with equivalent catalysts that have not undergone any pre-modification, to reduce the desulfurization reaction temperature by approximately 5 to 20° C., for a given residual sulfur content and all operating conditions being otherwise identical (pressure, amount of hydrogen and volume velocity per hour (VVH)). Such a gain in activity makes it possible to envision obtaining residual sulfur contents that are much less than 50 ppm, or even less than 10 ppm, in processed hydrocarbons, by varying the operating conditions. If the unit is already able to produce a low-sulfur petroleum fraction, this gain in activity will make it possible to reduce the temperature of the reactor for producing the desired sulfur content, and thus to keep the unit operational for an additional period that may be as long as several months.

The formulae (I) and (II) of the organic compound used in the present invention encompass compounds comprising two, three or four ester functions, or even more. In a preferred embodiment of the catalyst according to the invention, the residues $R_1$ and $R_2$ do not generally comprise any other ester substituents and the organic compound of formula (I) or (II) is a diester.

The number of carbon atoms separating the two groups >C=O of formulae (I) and (II) is preferably equal to 1, 2, or 4, and in particular equal to 1 or 2.

By way of examples of compounds of formula (I), mention may be made of alkyl ortho-phthalates, alkyl isophthalates, alkyl terephthalates, malonic acid esters, adipic acid esters, glutaric acid esters, 1,6-dioxacyclodecane-2,5-dione, dimethyl 2-(methoxymethyl)-succinate, dibutyl itaconate, diethyl 2,3-diacetylsuccinate, dimethyl cyclohexane-1,4-dicarboxylate and dimethyl 3,3'-dithiodipropionate.

By way of examples of compounds of formula (II), mention may be made of glycerol triacetate, propylene glycol diacetate, ethylene glycol dimethacrylate and pentaerythritol tetrakis(3-mercaptopropionate).

In a preferred embodiment of the present invention, the compound of formula (I) is a $C_1$-$C_4$ dialkyl succinate, preferably dimethyl succinate.

Preferably, the nonmodified catalyst, known per se, is a catalyst consisting of a refractory oxide carrier of alumina, silica or silica-alumina type containing from 0.1% to 10% by weight of at least one metal of group VIII, preferably nickel and/or cobalt, and from 1% to 20% by weight of at least one metal of group VIB, preferably molybdenum.

The catalyst may be a fresh, i.e. nonregenerated, catalyst originating directly from a manufacturer, but the pretreatment according to the invention with one or more compounds of formula (I) or (II) is also advantageous when it involves a catalyst generally regenerated by means of an appropriate chemical or thermal treatment, for example by means of calcination.

It is nevertheless known that, due to a specific method of preparation, certain fresh catalysts can be more or less refractory to the recommended treatments. Similarly, for the same reasons or subsequent to specific operating conditions experienced in the unit, regenerated catalysts can prove to be more or less refractory to these treatments.

The catalyst according to the invention preferably contains at least 0.001 mol of organic compound(s) of formula (I) or (II), in particular from 0.001 mol to 10 mol, preferably from 0.01 to 6 mol, and even more preferably from 0.1 to 3 mol of compound(s) of formula (I) or (II) per mole of metals of groups VIB and VIII.

A subject of the invention is also a method for preparing the modified hydroprocessing catalyst described above. This method of modification comprises bringing a catalyst comprising a carrier based on at least one refractory oxide, at least one metal of group VIII in the oxide state and at least one metal of group VIB in the oxide state into contact with at least one organic compound of formula (I) or (II)

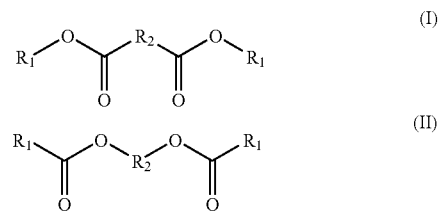

in which
each $R_1$ independently represents a $C_1$-$C_{18}$ alkyl, $C_2$-$C_{18}$ alkenyl, $C_6$-$C_{18}$ aryl, $C_3$-$C_8$ cycloalkyl, $C_7$-$C_{20}$ alkylaryl or $C_7$-$C_{20}$ arylalkyl group, or the two $R_1$ groups together form a $C_2$-$C_{18}$ divalent group, and $R_2$ represents a $C_1$-$C_{18}$ alkylene, $C_6$-$C_{18}$ arylene or $C_3$-$C_7$ cycloalkylene group, or a combination thereof, it being possible for the carbon chain of the hydrocarbon-based groups represented by $R_1$ and $R_2$ to contain or bear one or more heteroatoms selected from N, S and O, and for each of the groups $R_1$ and $R_2$ to bear one or more substituents of formula —C(=O)O—$R_1$ or —O—C(=O)—$R_1$ where $R_1$ has the meaning indicated above.

According to the invention, the bringing into contact is generally and preferably an impregnation.

When the compound(s) of formula (I) or (II) is (are) liquid(s) at the impregnation temperature, the bringing into contact can be carried out in the absence of solvent. The bringing of the nonmodified catalyst into contact with the organic compound(s) of formula (I) or (II) is preferably carried out by bringing the catalyst into contact with a solution containing the organic agent(s). The volume of solution may be less than, equal to or greater than the pore volume of the catalyst. The method using a volume of solution less than or equal to the pore volume of the catalyst is sometimes called "dry impregnation". When the volume of solution is greater than the pore volume of the catalyst, the excess solution will be eliminated after the adsorption of the organic compound(s) of formula (I) or (II) onto the catalyst.

The catalyst can be brought into contact with the compound(s) of formula (I) or (II) in the presence of at least one solvent.

When the bringing into contact is carried out in the presence of solvent, the organic compound(s) of formula (I) or (II) is (are) preferably at least partially soluble in the solvent used. The choice of the solvent is of particular importance in the implementation of the method. The selection of the solvent is based on various criteria, such as its solvent capacity for the compound(s) of formula (I) or (II), its dispersing effect on the compound(s) of formula (I) or (II), its wetting effect on the surface of the catalyst and its availability on the market under economically acceptable conditions.

Among the solvents that will advantageously be used in the invention, mention may be made of water, supercritical fluids such as carbon dioxide, aromatic, aliphatic or alicyclic solvents, petroleum fractions, mono- and polyhydroxylated solvents such as ethanol, tert-butanol, ethylene glycol, diethylene glycol, triethylene glycol, propylene glycol, polyethylene glycol (PEG), glycerol, alkyl esters such as ethyl acetate, ketones such as acetone or methyl ethyl ketone, N-methylpyrrolidone, solvents containing an amide function such as dimethylacetamide, solvents containing a nitrile function such as acetonitrile, alkyl carbonates such as ethyl carbonate, ethers such as tetrahydrofuran, sulfur-containing solvents such as dimethyl sulfoxide and sulfolane, acids such as acetic acid, and halogenated solvents, or a mixture of several of these solvents.

Among these solvents, preference is in particular given to water, toluene, xylenes, ethylene glycol, diethylene glycol, triethylene glycol, glycerol, ethanol, tert-butanol, polyethylene glycol (PEG), most commonly of molecular weight from 118 (triethylene glycol) to 1000, white spirit and petroleum ether.

The organic compound(s) of formula (I) or (II) can optionally be introduced in the presence of at least one acid, generally selected from carboxylic acids, hydrocarboxylic acids and polyacids (such as formic acid, acetic acid, glycolic acid, lactic acid, tartaric acid, maleic acid, citric acid, glyceric acid, gluconic acid, methoxyacetic acid, ethoxyacetic acid, malonic acid, L-(+)-ascorbic acid, salicylic acid, oxalic acid, orthophthalic acid, succinic acid, glyoxylic acid, etc.), thiocarboxylic acids (such as thiobenzoic acid, mercaptoacetic acid, 1- and 2-mercaptopropionic acid, 2,3-dimercaptosuccinic acid, mercaptosuccinic acid, thioacetic acid, thioglycolic acid, thiodiglycolic acid, dithiodiglycolic acid, etc.), aminocarboxylic acids (nitrilotriacetic acid, EDTA (ethylenediaminetetraacetic acid). Among these acids, the acids particularly preferred are lactic acid, maleic acid, tartaric acid, citric acid, succinic acid, oxalic acid, thioacetic acid, thioglycolic acid, nitriloacetic acid and EDTA.

The acid(s) can be introduced with the compound(s) of formula (I) or (II) or separately, if, for example, the mixture obtained is not homogeneous. In this case, it may be advantageous to use a solvent which allows the simultaneous introduction of the acid(s) with the compound(s) of formula (I) or (II), the solvent then ensuring dissolution of all the organic compounds present. Finally, it is also possible, when the acid(s) is (are) introduced separately (before or after, preferably before) from the compound of formula (I) or (II), to use a solvent different than that used to introduce the compound of formula (I) or (II).

The bringing into contact of the catalyst, optionally pre-dried at between 10 and 600° C., preferably between 15 and 300° C., more preferably from 20 to 180° C., with a solution of one or more compounds of formula (I) or (II) during the impregnation step can last from 1 minute to 7 days, preferably from 10 minutes to 8 hours, at a temperature of between 0° C. and 200° C., preferably at ambient temperature, at a low pressure of between atmospheric pressure and 5 bar, preferably at atmospheric pressure. When a solution of acid(s) is introduced before the solution of organic compound(s) of formula (I) or (II), the operating conditions for the impregnation with the acid(s) are similar to those for the impregnation with the organic compound(s) of formula (I) or (II). In the optional case where the catalyst is dried, it is possible to advantageously take advantage of the residual heat of the catalyst to carry out a hot impregnation.

At the end of the impregnation step, the catalyst can be subjected, optionally after elimination of an excess of impregnation solution, to an optional maturation step at a temperature generally of from 0 to 100° C., preferably ambient temperature (approximately 20° C.) to 80° C., generally at atmospheric pressure or up to pressures that are generally used in hydroprocessing or hydroconversion methods, the duration of which may be between a few minutes and a few years, when the catalyst would remain stored in vats. Preferably, the maturation step can last from a few minutes to 2 days. An optional thermal treatment, consecutive to the maturation step, can be carried out at temperatures of from 50° C. to 250° C., preferably from 60 to 180° C., lasting from a few minutes to several days, preferably from 30 minutes to 3 hours, under an inert or noninert atmosphere, with or without gas flow, generally at atmospheric pressure or up to pressures that are generally used in hydroprocessing or hydroconversion methods.

The optional maturation and thermal treatment steps can possibly be omitted when the catalyst is loaded directly into the hydroprocessing or hydroconversion unit.

The catalyst modified by impregnation with the compound(s) of formula (I) or (II) is completely stable at ambient temperature and when exposed to the air. The modification of the catalyst can consequently be carried out ex situ, i.e. outside a hydroprocessing, generally hydroconversion, reactor, and this is a preferred embodiment of the method according to the invention. The ex situ implementation of the method according to the invention can optionally be combined with an ex situ sulfurization of the modified catalyst according to the invention. This allows the refiner to purchase a product immediately ready for use and to reduce as much as possible the time lost when initiating the unit.

It is also advantageous to carry out the step of modification of the catalyst with the compound(s) of formula (I) or (II) ex situ, and to sulfurize the modified catalyst in situ in the hydroprocessing reactor. In this case, the catalyst can be placed in the processing unit more easily since, unlike the sulfurized catalyst, there is no risk of the nonsulfurized catalyst self-igniting.

Yet another variant consists in carrying out both the modification of the catalyst and the subsequent sulfurization in situ. In this case, the method of preparation according to the invention is characterized in that the catalyst is brought into contact with the compound(s) of formula (I) or (II) in the presence of hydrogen and of at least one sulfurization agent preferably selected from hydrogen sulfide, elemental sulfur, $CS_2$, mercaptans, sulfides and/or polysulfides, and hydrocarbon fractions with a boiling point of less than 400° C. containing sulfur compounds, generally in a hydroprocessing reactor.

It should be noted that, even when the modification of the catalyst with the compound(s) of formula (I) or (II) is carried out in situ in the hydroprocessing reactor, these two operations generally constitute two separate steps carried out one after the other, the bringing into contact with the compound(s) of formula (I) or (II) always preceding the sulfurization step. However, these two steps can also be carried out simultaneously.

In addition to the impregnation of the organic compounds into the pores of a fresh or regenerated catalyst, it is also possible to introduce said organic compounds during the manufacturing/forming of the catalyst. It is, for example, possible to incorporate the organic compound(s) of formula (I) or (II) into the carrier, even before the deposition of the compounds of metals of groups VIB and VIII. This can be done by mixing one or more organic compounds with the constituents of the carrier before the forming of the latter, or else by impregnating the carrier formed with the organic compounds.

Another possibility consists in introducing the organic compound(s) and the compounds of metals of groups VIB and VIII simultaneously, either by mixing them with the constituents of the carrier before forming, or by impregnating an already formed carrier with both the organic compound(s) and the salts of metals of groups VIB and VIII. One or other of the operations can be followed by drying, carried out under conditions such that at least a part of the organic compounds is conserved in the catalyst.

It is also possible to incorporate the organic compounds of formula (I) or (II) only after the salts of metals of groups VIB and VIII. One or other of these steps can optionally be followed by drying and/or calcination under conditions such that at least a part of the compounds is conserved in the catalyst.

The organic compound(s) of formula (I) or (II) can be introduced into the catalyst in liquid and/or particulate solid form and/or in the form of a solution or suspension in an appropriate solvent.

A subject of the invention is also a method of in situ or ex situ activation of a hydroprocessing catalyst as described above. This activation is carried out by placing the catalyst in the presence, simultaneously or successively, of hydrogen and at least one sulfurization agent preferably selected from hydrogen sulfide, elemental sulfur, $CS_2$, mercaptans, sulfides and/or polysulfides, and hydrocarbon fractions with a boiling point of less than 400° C. containing sulfur compounds. A preferred sulfurization agent is dimethyl disulfide (DMDS).

The sulfurization agent can be introduced in the form of a gas or in a form diluted in a solvent, or as an additive for the feedstock to be hydroprocessed.

Finally, a subject of the invention is the use of the catalyst thus activated in situ or ex situ, for the hydroprocessing and/or hydrocracking of hydrocarbons, in particular of hydrocarbons derived from petroleum fractions with a boiling point of between 40 and 560° C.

The examples given in the remainder of the present description are aimed at illustrating and not at limiting the invention.

EXAMPLE 1

In the present example, a method of preparing the catalysts according to the invention is described, these catalysts then being used in example III.

The starting material is a commercial catalyst (catalyst A), consisting of a combination containing 3% by weight of cobalt and 10% by weight of molybdenum on an alumina carrier, available on the market and commonly used by refiners in hydrodesulfurization units.

The modification of this catalyst A with a compound of formula (I) is carried out in the following way: 200 g of catalyst A are placed in the round-bottomed flask of a rotary evaporator rotating at 45 rpm. A solution consisting of 53.3 g of dimethyl succinate dissolved in 66 ml of toluene is injected, over 35 minutes, into the heart of the catalyst. The impregnated solid is left to slowly rotate (20 rpm) for 16 hours before being subjected to a reduced pressure, equal to 2700 Pa, and a temperature of 50° C. for 30 minutes. After most of the toluene has been evaporated off, a catalyst with a dry appearance is obtained.

After 115 days at ambient temperature, 100 ml of this catalyst are loaded into a reactor of a pilot unit for desulfurization of diesel oil for the purpose of carrying out an activity test as described in example III. After loading, the catalyst is subjected to heat treatment at 180° C. for 2 hours, and then to further heat treatment at 150° C. for 14 hours, the whole under a stream of nitrogen of 20 l/h. The catalyst thus obtained is called catalyst B.

EXAMPLE II

In the present example, a method of preparing the catalyst according to the invention in the absence of solvent is described. This catalyst is then used in example III.

100 g of catalyst A are placed in the round-bottomed flask of a rotary evaporator and then rotated at 45 rpm. 54.8 g of dimethyl succinate are injected, over 12 minutes, into the heart of the catalyst. The impregnated solid is then heated at 50° C. for 30 minutes in order to accelerate the dispersion of the liquid in the catalyst.

After storage for 49 days at ambient temperature, 100 ml of this catalyst are loaded into the reactor of the diesel oil desulfurization pilot unit for the purpose of carrying out the activity test described in example III. The catalyst is subjected to heat treatment at 150° C. for 16 hours under a stream of nitrogen of 20 l/h. This catalyst according to the invention is called catalyst C.

EXAMPLE III

Each of catalysts B and C (according to the invention) is sulfurized with a diesel oil with 2% by weight of added dimethyl disulfide (DMDS) according to the procedure recommended by the manufacturer of catalyst A.

In the present example, the activity of catalysts B and C having undergone a modification according to the invention (example I and II) is compared with that of catalyst A not having undergone any modification treatment.

After sulfurization and stabilization of the three catalysts A, B and C, a feedstock comprising a mixture of 70% by weight of diesel oil and 30% by weight of a hydrocarbon fraction of LCO (light cycle oil) type derived from catalytic cracking is introduced. The characteristics of this feedstock, before hydroprocessing, are indicated in table I below.

TABLE I

| Feedstock type | 30% LCO-70% diesel oil mixture |
|---|---|
| Sulfur (ppm) | 9074 |
| Density at 15° C. (g/ml) | 0.8863 |
| Monoaromatics (% by weight) | 20.7 |
| Diaromatics (% by weight) | 21.3 |
| Triaromatics (% by weight) | 3.8 |
| Σ aromatics (% by weight) | 45.8 |
| Nitrogen (ppm) | 389 |
| Distillation according to standard ASTM D86 (° C.) | |
| Initial point | 180 |
| 5 vol % | 224 |
| 50 vol % | 291 |
| 95 vol % | 360 |
| Final point | 361 |

The hydroprocessing reaction is carried out under a pressure of $27 \times 10^5$ Pa (27 bar) with a hydrogen/hydrocarbon ($H_2$/HC) ratio of 250 Nl/l at a volume velocity per hour (VVH) of $1\ h^{-1}$.

To compare the desulfurization activities, the reaction temperature is adjusted, for each catalyst, to a value corresponding to a degree of desulfurization of 99%. The lower this temperature, for catalysts B and C according to the invention, in comparison with the corresponding temperature for the reference catalyst A, the more active these catalysts are in desulfurization.

The results obtained are represented in table II in the form of a temperature difference ($\Delta T$) relative to the reference temperature of catalyst A ($T_{HDS}$). They correspond to the temperature required to reach a degree of desulfurization of 99%.

TABLE II

|  | Catalyst | | |
| --- | --- | --- | --- |
|  | A | B | C |
| HDS | $T_{HDS}$ | $T_{HDS} - 7°$ C. | $T_{HDS} - 7°$ C. |

It is noted that catalysts B and C according to the invention make it possible to reach a degree of desulfurization of 99% at a temperature 7° C. lower than that required for catalyst A. They therefore have a hydrodesulfurization activity greater than that of catalyst A.

To compare the denitrogenation activities, the residual nitrogen content for a given reaction temperature $T_{HDN}$ is measured for each catalyst. The lower this residual nitrogen content, the more active the catalyst is in denitrogenation.

The results obtained are represented in table III.

TABLE III

|  | Catalyst | | |
| --- | --- | --- | --- |
|  | A | B | C |
| Residual nitrogen content at $T_{HDN}$ (ppm) | 120 | 78 | 60 |

It is noted that catalysts B and C according to the invention make it possible to reduce the residual nitrogen content to a greater extent than catalyst A, thereby showing that they are also more active in denitrogenation.

The invention claimed is:

1. A hydroprocessing catalyst for use in desulfurization, denitrogenation, dearomatization in the presence of hydrogen, and hydrocracking, comprising a carrier based on at least one refractory oxide, at least one metal of group VIII and at least one metal of group VIB of the Periodic Table of Elements, and at least one organic compound selected from $C_1$-$C_4$ dialkyl succinates;
    wherein the at least one organic compound is present in an amount of at least 0.001 to 10 moles per mole of metals of groups VIB and VIII; and
    wherein the hydroprocessing catalyst has been subjected to a thermal treatment at a temperature between 60° C. and 180° C. following an impregnation step during preparation of the hydroprocessing catalyst.

2. The catalyst as claimed in claim 1, wherein the at least one organic compound is dimethyl succinate.

3. A hydroprocessing catalyst for use in desulfurization, denitrogenation, dearomatization in the presence of hydrogen, and hydrocracking, comprising a carrier based on at least one refractory oxide, at least one metal of group VIII and at least one metal of group VIB of the Periodic Table of Elements, and at least one organic compound selected from $C_1$-$C_4$ dialkyl succinates;
    wherein the at least one organic compound is present in an amount of from 0.001 to 10 moles per mole of metals of groups VIB and VIII; and
    wherein the hydroprocessing catalyst has been subjected to a thermal treatment at a temperature between 60° C. and 180° C. following an impregnation step during preparation of the hydroprocessing catalyst.

4. The hydroprocessing catalyst for use in desulfurization according to claim 3, wherein the at least one organic compound is dimethyl succinate.

5. A hydroprocessing catalyst for use in desulfurization, denitrogenation, dearomatization in the presence of hydrogen, and hydrocracking, comprising a carrier based on at least one refractory oxide, at least one metal of group VIII and at least one metal of group VIB of the Periodic Table of Elements, and at least one organic compound selected from $C_1$-$C_4$ dialkyl succinates, and
    wherein the at least one organic compound is present in an amount of from 0.001 to 10 moles per mole of metals of groups VIB and VIII; and
    wherein the hydroprocessing catalyst has been subjected to a thermal treatment at a temperature between 60° C. and 180° C. following an impregnation step during preparation of the hydroprocessing catalyst.

6. The hydroprocessing catalyst for use in desulfurization according to claim 5, wherein the at least one organic compound is dimethyl succinate.

7. A method for preparing a hydroprocessing catalyst as claimed in claim 1, comprising:
    an impregnation step of bringing a nonmodified catalyst into contact with at least one organic compound selected from $C_1$-$C_4$ dialkyl succinates, wherein the nonmodified catalyst comprises a carrier based on at least one refractory oxide, at least one metal of group VIII and at least one metal of group VIB; and
    a step of subjecting the product of the impregnation step to a thermal treatment at a temperature between 60° C. and 180° C.

8. The method of preparation as claimed in claim 7, characterized in that the nonmodified catalyst is a regenerated catalyst.

9. The method of preparation as claimed in claim 7, characterized in that the impregnation step is followed by at least one maturation step carried out at a temperature of from 0 to 100° C. for a time between a few minutes and a few years.

10. The method of preparation as claimed in claim 7, characterized in that the nonmodified catalyst is brought into contact with the at least one organic compound in the presence of at least one of a solvent or an acid.

11. The method of preparation as claimed in claim 10, characterized in that the at least one organic compound is at least partially soluble in the solvent used.

12. The method of preparation as claimed in claim 10, characterized in that the solvent is selected from water, toluene, xylenes, ethylene glycol, diethylene glycol, triethylene glycol, glycerol, ethanol, tert-butanol, polyethylene glycol (PEG), white spirit and petroleum ether.

13. The method of preparation as claimed in claim 12, wherein the polyethylene glycol has a molecular weight from 118 to 1000.

14. The method of preparation as claimed in claim 13, wherein the polyethylene glycol is triethylene glycol.

15. The method of preparation as claimed in claim 7, characterized in that the nonmodified catalyst is brought into contact with the at least one organic compound ex situ outside the hydroprocessing reactor.

16. The method of preparation as claimed in claim 7, characterized in that the nonmodified catalyst is brought into contact with the at least one organic compound in the presence of hydrogen and at least one sulfurization agent in a hydroprocessing reactor.

17. The method of preparation as claimed in claim 16, wherein the sulfurization agent is selected from hydrogen sulfide, elemental sulfur, $CS_2$, mercaptans, sulfides, polysulfides and hydrocarbon fractions with a boiling point of less than 400° C. containing sulfur compounds.

18. A method of using an activated hydroprocessing catalyst comprising
   (i) a step of placing the hydroprocessing catalyst as claimed in claim 1 into contact with hydrogen and at least one sulfurization agent, and
   (ii) a step of bringing the activated hydroprocessing catalyst obtained in step (i) into contact with hydrocarbons.

19. The method of using an activated hydroprocessing catalyst as claimed in claim 18, wherein the sulfurization agent is selected from hydrogen sulfide, elemental sulfur, $CS_2$, mercaptans, sulfides, polysulfides and hydrocarbon fractions with a boiling point of less than 400° C. containing sulfur compounds.

20. The method of using an activated hydroprocessing catalyst as claimed in claim 19, characterized in that the sulfurization agent is dimethyl disulfide.

21. The method of using an activated hydroprocessing catalyst as claimed in claim 18, wherein the hydrocarbons are derived from petroleum fractions with a boiling point of between 40 and 560° C.

22. The method of using an activated hydroprocessing catalyst as claimed in claim 18, wherein the method is carried out during hydroprocessing or hydrocracking of the hydrocarbons.

\* \* \* \* \*